(12) United States Patent
Takahashi

(10) Patent No.: US 7,076,143 B2
(45) Date of Patent: Jul. 11, 2006

(54) OPTICAL WAVEGUIDE AND FABRICATING METHOD THEREOF

(75) Inventor: Morio Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/968,810

(22) Filed: Oct. 19, 2004

(65) Prior Publication Data

US 2005/0094957 A1    May 5, 2005

(30) Foreign Application Priority Data

Nov. 4, 2003  (JP) .............................. 2003-374026

(51) Int. Cl.
 *G02B 6/10* (2006.01)
(52) U.S. Cl. ........................ 385/129; 438/31
(58) Field of Classification Search ......... 385/129–132
 See application file for complete search history.

(56) References Cited

U.S. PATENT DOCUMENTS

| 4,006,964 A | 2/1977 | Mahlein et al. |
| 5,343,542 A | 8/1994 | Kash et al. |
| 6,233,375 B1 | 5/2001 | Lang et al. |

FOREIGN PATENT DOCUMENTS

| EP | 0 304 709 A2 | 3/1989 |
| EP | 1 085 351 A2 | 3/2001 |
| GB | 2 384 319 A | 7/2003 |
| JP | 1-198706 | 8/1989 |
| JP | 1-202702 | 8/1989 |
| JP | 01-202702 | * 8/1989 |
| JP | 04-328876 | * 11/1992 |
| JP | 06-235837 | * 2/1993 |
| JP | 5-188231 | 7/1993 |
| JP | 6-235837 | 8/1994 |

OTHER PUBLICATIONS

Patent Abstracts of Japan Publication No. 04125602, published Apr. 27, 1992.
Patent Abstracts of Japan Publication No. 2001318255, published Nov. 16, 2001.
Anada, T. et al., "Analysis of Polarization-Maintaining 3-D Waveguide in Very Thin Multilayer Films Structure", *24th European Microwave Conference Proceedings, Nexus Business Communications*, 1:573-578 (1994), XP-000643213.
Baba, K. et al., "T M-Pass Glass Waveguide Polariser with Periodic Multilayer Cladding Overlaid with Isotropic Dielectric Media", *Electronics Letter*, 36(17):1461-1462 (2000), XP006015604.

* cited by examiner

*Primary Examiner*—Brian Healy
*Assistant Examiner*—Christopher M. Kalivoda
(74) *Attorney, Agent, or Firm*—Scully, Scott, Murphy & Presser

(57) ABSTRACT

A core for propagating optical signals, and a pair of first and second cladding layers disposed opposite each other, between which the core is disposed, are provided, which prevents light scattering between the cladding and the core, and reduces polarization dependency. The first cladding layer on which the core is formed has a multilayer film on the boundary face side contacting the core, and the multilayer film has a multilayer structure in which a distortion stress exists among multiple materials.

20 Claims, 4 Drawing Sheets

14 UPPER CLADDING
12 LOWER CLADDING
11 SUBSTRATE

PRIOR ART

OPTICAL WAVEGUIDE AND FABRICATING METHOD THEREOF

BACKGROUND OF THE INVENTION

1. Field of the Invention

The present invention relates to an optical waveguide such as a planar lightwave circuit and a fabricating method thereof, and in particular, to an optical waveguide and a fabricating method thereof in which a core for transmitting a light is formed by deposition.

2. Related Art

As demands of various communications such as the Internet are increasing, communication networks are expanding, so that the node configuration is tend to be complicated and each node is required to perform high-level processing of various kinds. In such a situation, attention is directed to an optical switching technique capable of performing processing without converting optical signals into electric signals. In order to realize optical communication systems, a planar lightwave circuit (PLC) technique suitable for integration is promising.

The planar lightwave circuit technique suitable for integration is usually configured to transmit light through multiple passive optical waveguides such as an optical wavelength multiplexer/demultiplexer, a dispersion compensator, a gain equalizer for optical fiber amplifier, an optical switch, and the like. As a result, the propagation length of the light becomes longer, so that it is indispensable to suppress propagation loss in these passive devices. However, there is a fact that in an optical waveguide having a planar lightwave circuit, the propagation loss is extremely large comparing with that of an optical fiber. Accordingly, if a number of these optical waveguides are connected in series to be used, a serious problem is caused in its propagation loss.

FIG. 1 shows the main part of of the cross-sectional structure of an optical waveguide having a conventional planar lightwave circuit. On a substrate 11, there is formed a lower cladding 12 constituting the lower half of the cladding in a prescribed thickness. On the lower cladding 12, a core 13 is formed, and further an upper cladding 14 is formed so as to cover around the core 13.

In the optical waveguide of this kind, although the surface of the substrate has a sufficient smoothness, the surface becomes to have fine irregularities when the lower cladding 12 is formed above a certain thickness. Then, when the core 13 is formed on the lower cladding 12, the Mie scattering is caused at the boundary between them. The Mie scattering means light scattering with the irregularities on the surface of an object in micron size, which cannot be disregarded with reference to the wavelength. The scattering loss at the boundary between the lower cladding 12 and the core 13 is a serious cause of a propagation loss. To cope with this, the surface of the lower cladding 12 is optically polished so as to be the smooth face, and the core 13 is formed after this polishing step, conventionally.

However, with the optical polishing, the fabricating efficiency of the optical waveguides reduces, so as to deteriorate mass productivity. Further, it is required to perform product management so that the surface roughness by the optical polishing becomes uniform in respective optical waveguides, which troubles the managing operation. To cope with this, a technique in which a smoothing layer is formed at the boundary between the cladding and the core so as to prevent light scattering is proposed as a first proposal in, for example, Japanese Patent Application Laid-open No.6-235,8375 (paragraphs [0017], [0018] and FIG. 4A).

FIG. 2 shows the main part of the cross-sectional structure of an optical waveguide according to the first proposal. A glass substrate 21 serving as a cladding of the optical waveguide has a refractive index of n1, and fine irregularities 22 exist on the surface thereof. The glass substrate 21 is dried and then put into a firing furnace, then a sol-gel glass material is fired at a prescribed temperature and hardened, whereby a smoothing layer 23 with a smooth surface is formed integral with the glass substrate 21. The refractive index n2 of the smoothing layer 23 is almost equal to the refractive index n1. On the surface of the smoothing layer 23, corning glass 7059 (product name) is deposited by sputtering, so as to form a core 24 with a refractive index n3 which is larger than the refractive index n1 and the refractive index n2.

In the optical waveguide shown in FIG. 2, the sol-gel glass material is entered by spin coating or the like into the fine irregularities 22 on the surface of the glass substrate 21 so as to smooth the surface. However, the optical waveguide formed in this way causes a problem of large polarization dependency due to a warp of the substrate 21 influenced by a distortion stress which is based on the difference of coefficient of thermal expansion of the smoothing layer 23 and the core 24 and for the glass substrate 21.

SUMMARY OF THE INVENTION

It is therefore an object of the present invention to provide an optical waveguide capable of preventing light scattering at the boundary between the cladding and the core, and reducing the polarization dependency(polarization dependent loss; PDL).

In order to achieve the aforementioned object, an optical waveguide according to the present invention comprises: a core for propagating optical signals; and a pair of first cladding layer and second cladding layer disposed opposite each other, between which the core is disposed. The first cladding layer on which the core is laminated has a multilayer film on the boundary face side contacting the core, and the multilayer film has a multilayer structure in which a distortion stress exists among a plurality of materials.

According to the present invention, the first cladding layer is provided with a multilayer film on the boundary face side contacting the core, and the multilayer film is formed to have a multilayer structure in which a distortion stress exists among the plurality of materials. Thereby, the surface by which the first cladding layer supports the core becomes flat, which prevents light scattering at the boundary between the first cladding layer and the core. Further, a warp caused, at the time of laminating the film structure, in the cladding layer or the substrate supporting the cladding layer is also suppressed, whereby the polarization dependency is reduced.

Further, it is preferable that the optical waveguide according to the present invention be fabricated through the steps of: forming the first cladding; laminating, on the first cladding layer, a plurality of materials so as to have the multilayer structure; laminating the core on the multilayer structure; and laminating the second cladding layer on the first cladding layer on which the core is formed. In the step of laminating the plurality of materials, a distortion stress is caused among the plurality of materials by annealing.

As described above, in the present invention, a number of materials are laminated on the first cladding layer so as to cause a distortion stress among them. Thereby, the surface of the multilayer structure on which the core is laminated becomes flat, which prevents light scattering at the boundary between the first cladding layer and the core. Further, a warp, caused at the time of laminating the film structure, of the cladding layer or the substrate supporting the cladding layer is also suppressed, whereby the polarization dependency is reduced.

As described above, in the present invention, the first cladding layer is provided with a multilayer film, whereby the boundary face between the first cladding layer and the core is maintained to be flat, which prevents a light scattering phenomenon. Further, a distortion stress against heat is eased inside the film structure when forming the multilayer film, whereby a warp of the cladding layer or the substrate is suppressed and the polarization dependency is reduced.

PREFERRED EMBODIMENTS OF THE INVENTION

An embodiment of the present invention will be described in detail below.

Figure 1:
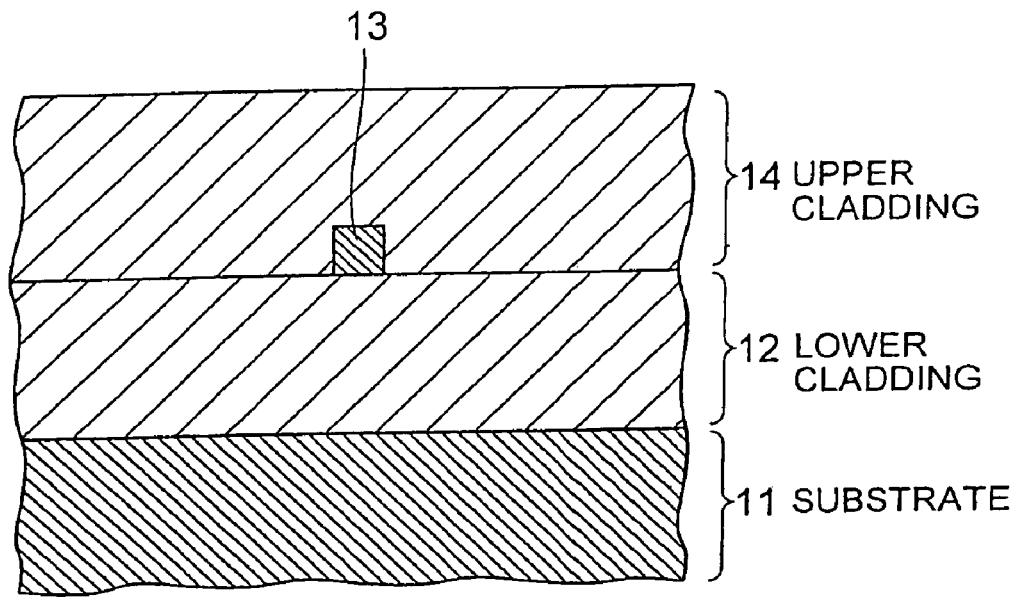
FIG. 1 is a cross-sectional view showing the main part of an optical waveguide using a conventional planar lightwave circuit.
Figure 2:
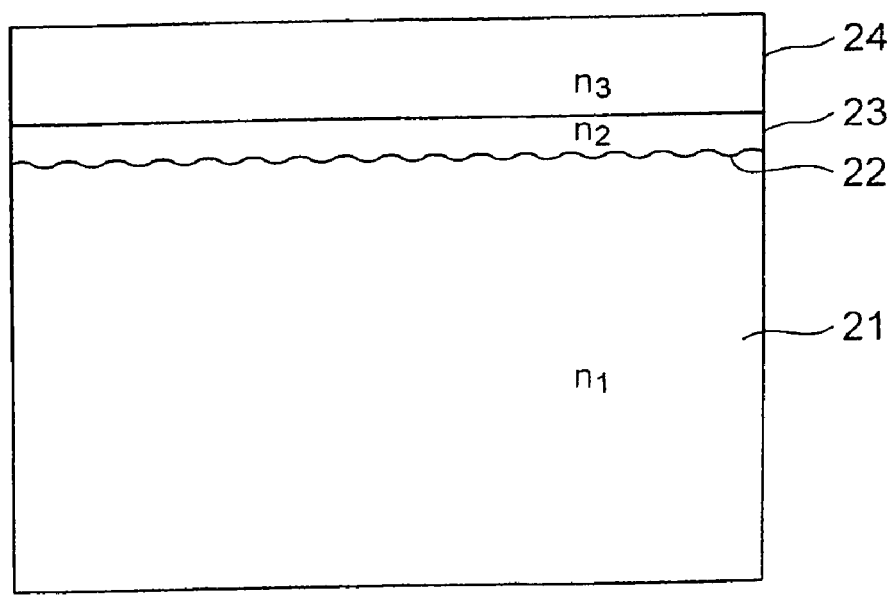
FIG. 2 is a cross-sectional view showing the main part of the sectional structure in the process of fabricating the optical waveguide according to the conventional example.
Figure 3:
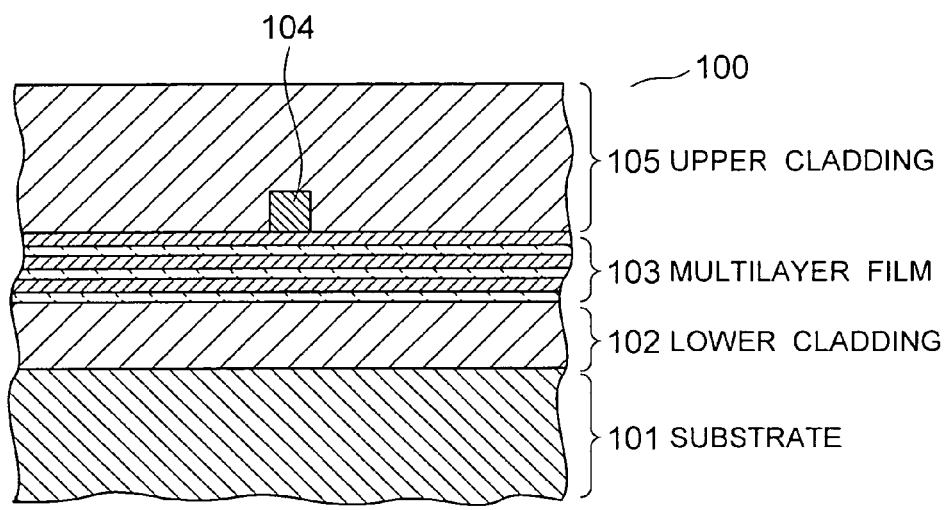
FIG. 3 is a cross-sectional view showing the main part of an optical waveguide according to a first embodiment of the present invention.

FIG. 3 shows the main part of the cross-sectional structure of an optical waveguide according to a first embodiment of the present invention. This optical waveguide 100 includes a lower cladding 102 formed on a substrate 101. The surface of the lower cladding 102 has fine irregularities, not shown. On the lower cladding 102, a multilayer film 103 is formed, and a core 104 is formed on a prescribed position of the multilayer film 103. On and around the core 104, an upper cladding 105 is formed. An optical waveguide is formed of the lower cladding 102, the multilayer film 103 and the upper cladding 105 positioned around the core 104.

The multilayer film 103 has the multilayer structure in which a distortion stress exists among multiple materials, and the film surface contacting the core 104 is flat.

The lower cladding 102 corresponds to a first cladding layer on which the core is laminated. Further, the upper cladding 105 corresponds to a second cladding layer which is laminated on the first cladding layer so as to cover the core 104. Hereinafter, the first cladding layer is indicated as the lower cladding 102, and the second cladding layer is indicated as the upper cladding 105.

Figure 4:
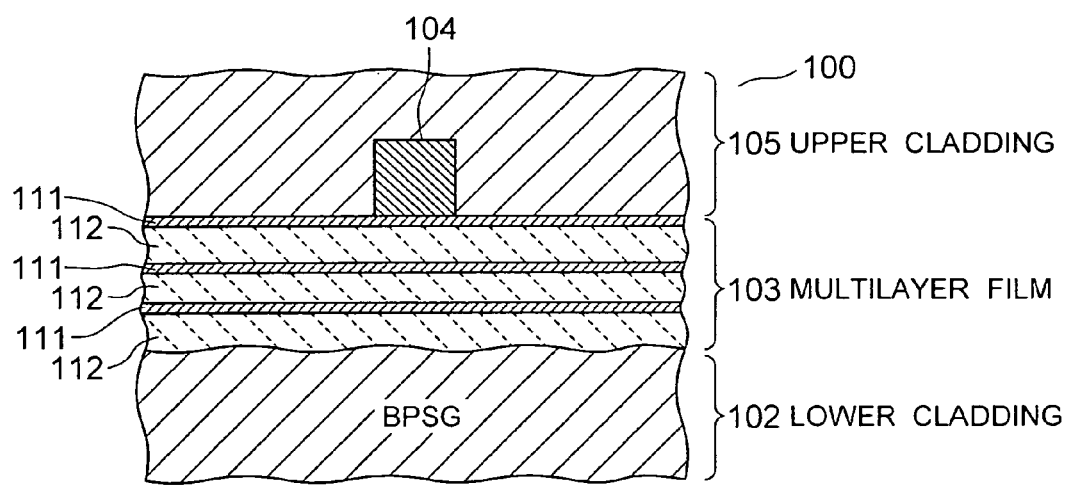
FIG. 4 is a cross-sectional view showing the main part by enlarging a part around a multilayer film according to the first embodiment.

FIG. 4 shows an enlarged view of the part around the multilayer film of the optical waveguide. The multilayer film 103 shown in FIG. 4 is formed to have a film structure composed of a number of materials having different softening temperatures (melting temperatures), in order to have a multilayer structure in which a distortion stress exists among multiple materials. Layer films on the side of the lower cladding 102, among the layer films laminated on each other in the multilayer film, are formed of a material with a high softening temperature, which films are indicated as second films 112. The remaining layer films, which are on the side of the core 104, are formed of a material with a lower softening temperature, which films are indicated as first films 111. Further, the films 112 on the side of the lower cladding 102 are set to be thicker in film thickness, and the films 111 on the side of the core 104 are set to be thinner in film thickness.

The multilayer film 103 is so configured that the first film 111 unsusceptible to high temperature annealing (that is, the softening temperature is high), and the second film 112, the melting temperature of which is low, are laminated in turn for multiple times. In the present embodiment, three pairs of first film 111 and second film 112 are laminated. The first film 111 is thinner than the second film 112, and is made of a material unsusceptible to high temperature annealing. The second film 112 is made of a material, the melting temperature (softening temperature) of which is low. Here, annealing means a process of removing distortions caused in forming by heating to a certain temperature. In the present embodiment, heat treatment was performed in $O_2$ atmosphere of about 800° C. to 1100° C.

In the present embodiment, the substrate 101 shown in FIG. 3 is formed of a Si (silicon) material, and the thickness thereof is 0.8 mm. The substrate 101 may be formed of a semiconductor other than Si or an insulating material such as silica glass. The lower cladding 102 and the upper cladding 105 are made of BPSG, which is a mixture of B (boron), P (phosphorus) and SG (silica glass:$SiO_2$). The first film 111 is a silica glass layer made of NSG (nondope $SiO_2$) or PSG, which is a mixture of P (phosphorus) and SG (silica glass:$SiO_2$) with a low P concentration. The film thickness is 0.15 µm, for example. The second film 112 is a silica glass layer made of BPSG, BSG(a mixture of B (boron) and SG (silica glass:$SiO_2$)) or GPSG, that is, a mixture of Ge (germanium), P (phosphorus) and SG (silica glass:$SiO_2$). The film thickness of the second film 112 is 0.5 µm, for example. Further, the first film 111 and the second film 112 have the almost same refractive index as that of the lower cladding 102 and the upper cladding 105. Comparing with the core 104, the value is small. In other words, assuming that the refractive index of the core 104 is n3, and the refractive index of the multilayer film 103 is n2, it is set to satisfy the condition of n3>n2.

The core 104 has a rectangle cross section with the height and the width of 5.5 µm, for example, respectively, and is made of GPSG or the like. The refractive index difference between the core 104, and the lower cladding 102 and the upper cladding 105 is 0.65 percent, for example.

Although the core 104 has a rectangle cross section, it is not limited to this structure, and it can be modified in various ways. Further, although the multilayer film 103 is formed to have a film structure made of at least two different materials selected from the group consisting of silica glass, silica glass added with phosphorus, silica glass added with boron, and silica glass added with germanium, it is not limited to this structure. The multilayer film 103 may be formed to have a film structure made of at least two materials with different material characteristics selected from the group consisting of silica glass and silica glass added with such an additive of phosphorus, boron or germanium.

The first film 111, made of NSG or the like, is unsusceptible to high temperature annealing, whereby it is less likely to be melted by heating, so that the film shape is well maintained. In contrast, the second film 112 made of BPSG or the like, is susceptible to high temperature annealing, whereby it is likely to be melted by heating, so that the film shape is easily deformed. Further, if the films have the same film thickness, a tensile stress applied in a face direction is caused in the first film 111 when it is cooled after heating.

Thus, the fine irregularities on the lower cladding 102 can be effectively flattened by the combination of the second film 112 fitting well to the state thereof and the first film 111 contributing to the flattening by maintaining the film shape and by the tension on the surface when cooled. Then, by repeatedly laminating the pair of the first and the second films 111 and 112, the effect of flattening of the surface caused by each pair can be accumulated.

Next, a method of fabricating the optical waveguide of the present embodiment will be explained. First, on the silicon substrate 101 in thickness of 0.8 mm, there is provided the lower cladding 102 formed of, for example, BPSG deposited in thickness of 14 μm as a glass film mainly made of silica, by the atmospheric pressure chemical vapor deposition (AP-CVD).

On the lower cladding 102, the first film 111 is deposited in thickness of 0.15 μm, and then the second film 112 is deposited in thickness of 0.5 μm thereon. The aforementioned process of depositing the first film 111 and the second film 112 is repeated for three times, and then high temperature annealing is performed in $O_2$ atmosphere at about 800° C. to 1100° C. Thereby, the top surface of the multilayer film 103 is flattened.

On the multilayer film 103 formed in this way, a core layer in height (film thickness) of 5.5 μm is deposited, and then the core 104 is formed by photolithography or reactive ion etching (RIE). The width of the core is 5.5 μm. Then, the upper cladding 105 made of BPSG is deposited to have a film thickness of, for example, 15 μm by AP-CVD so as to bury the core 104, whereby the optical waveguide 100 consisting of an inlay optical waveguide is formed.

Figure 5:
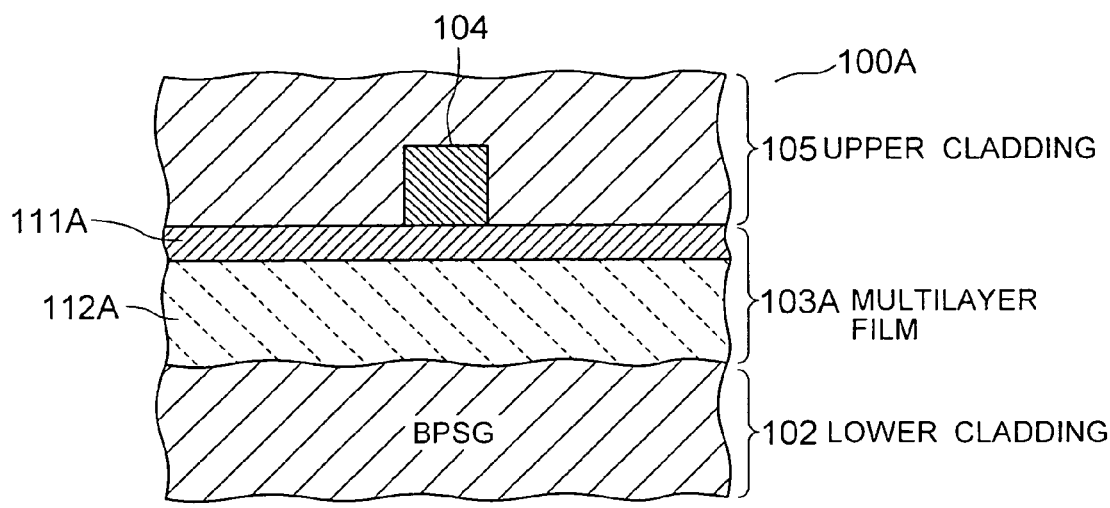
FIG. 5 is a cross-sectional view showing the main part of the optical waveguide in which the multilayer film, consisting of a first film and a second film, is formed on the lower cladding.

FIG. 5 shows the main part of an optical waveguide in which a multilayer film, consisting of one layer of each of the first film and the second film, is formed on the lower cladding, as a reference for comparing with the aforementioned embodiment.

The film thickness of the multilayer film 103A in the optical waveguide 100A, shown in FIG. 5, is set to be one which does not reach the upper limit value for not causing a warp to the substrate 101 or the lower cladding 102.

In the case of the optical waveguide 100A shown in FIG. 5, the second film 112A disposed on the lower cladding 102 is just one layer, whereby the film thickness thereof must have a certain thickness so as to absorb the irregularities effectively.

However, in the case of the optical waveguide 100A shown in FIG. 5, smoothing of the surface cannot be achieved only with the second film 112A being thickened, since the second film 112A is made of a material having the same characteristics as that of the lower cladding 102.

In view of the above, in the case of the optical waveguide 100A shown in FIG. 5, it is also required to thicken the first film 111A in order to maintain the total surface state.

However, if the first film 111A is thickened exceeding a certain thickness in the case of the optical waveguide 100A shown in FIG. 5., the tensile stress applied in a face direction becomes too large, causing a phenomenon of the face being warped when the optical waveguide is cooled.

When a warp is caused, a stress applied to the core in a face direction of the lower cladding 102 and a stress applied in a perpendicular direction thereto differs, whereby an anisotropy of the reflective index is caused. Thereby, a polarization dependency is generated in the optical waveguide, causing a problem of large propagation loss of light or the like.

On the other hand, in the embodiment shown in FIG. 4, a prescribed film thickness of the multilayer film 103, not reaching the upper limit value for not causing a warp in the substrate 101 or the lower cladding 102, is divided into three. Each layer film, having an equal one-third film thickness, is formed of the pair of first film 111 and second film 112. Thus, the multilayer film 103 in the prescribed thickness is formed of three pairs of first film 111 and second film 112. Further, the film thickness of the first film 111 is set to be thinner than that of the second film 112.

In the present embodiment shown in FIG. 4., the first film 111 and the second film 112 have different softening temperatures, whereby a distortion stress is caused between the first film 111 and the second film 112 by annealing, which amplifies the effect of flattening in sequence.

Therefore, this embodiment can achieve flattening better than the case of the optical waveguide 100A shown in FIG. 5.

(First Modification)

Figure 6:
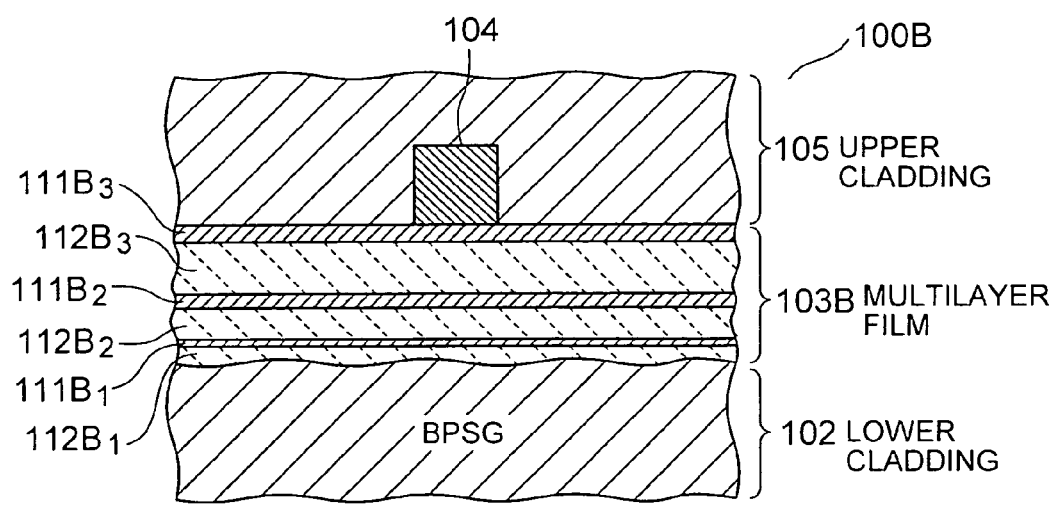
FIG. 6 is a cross-sectional view showing the main part of an optical waveguide according to a first modification of the present invention.

FIG. 6 shows the main part of an optical waveguide of a first modification according to the present invention. The multilayer films 103 in the embodiments shown in FIG. 3 and in FIG. 6 are different in their multilayer configurations formed by combining multiple materials having different film thickness. In the embodiment shown in FIG. 3, the film thickness of the multiple films 111 are set to be equal, and the film thickness of the other multiple films 112 are set to be equal and thicker than that of the films 111.

On the other hand, in the embodiment shown in FIG. 6, the multiple films 111 have different film thickness in the vertical direction. The other multiple films 112 have different film thickness in the vertical direction, and are set to be thicker than the film thickness of the films 111. More specifically, an optical waveguide 100B of the first modification is so configured that on the lower cladding 102, a second film 112B1 is formed, and further a first film 111B1 is formed thereon. Then, on the pair of these two kinds of films, another pair of second film 112B2 and first film 111B2 are formed, and further, yet another pair of second film 112B3 and first film 111B3 are formed thereon. Note that the film thickness of the pair in the middle is twice as thick as that of the lowest pair, and the film thickness of the pair on top is three times as thick as that of the lowest pair. In this way, by forming the multilayer film 100B so as to have thicker film thickness in the upper pair as shown in this Figure, the flattening effect by heating is larger in the lower layers in the Figure when annealing is performed before forming the core 104 and the upper cladding 105, whereby the multilayer film 103B can be flattened effectively.

(Second Modification)

Figure 7:
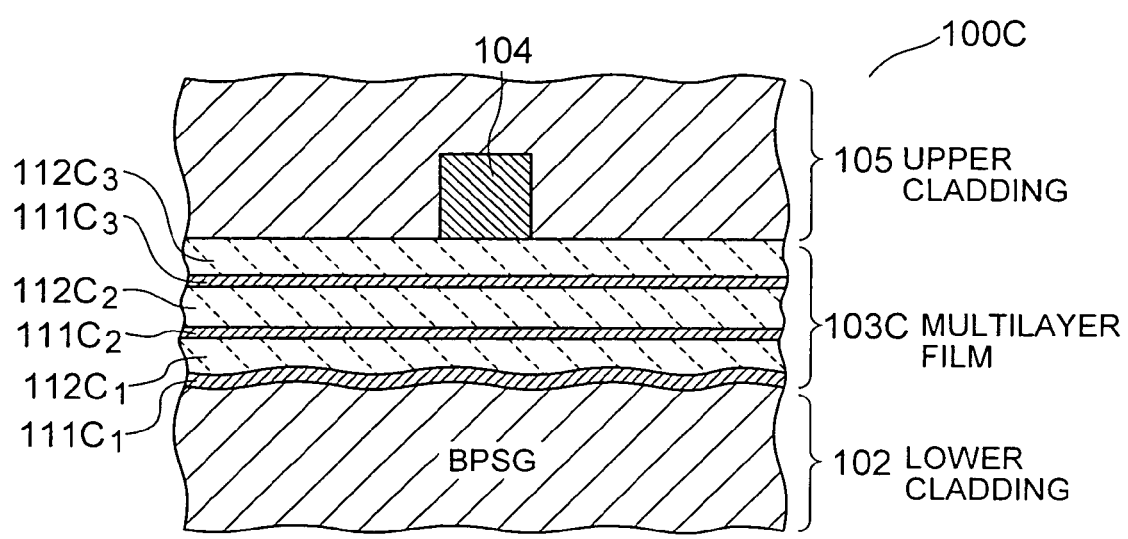
FIG. 7 is a cross-sectional view showing the main part of an optical waveguide according to a second modification of the present invention.

FIG. 7 shows the main part of an optical waveform of a second modification according to the present invention. An optical waveguide 100C of the second modification is so configured that on the lower cladding 102, a first film 111C1 is formed, and further a second film 112C1 is formed thereon. Then, on the pair of these two kinds of films, another pair of first film 111C2 and second film 112C2 are formed, and further, yet another pair of first film 111C3 and second film 112C3 are formed thereon. In this way, the order of film arrangement is opposite to the films described above. The lower cladding 102 located right under the first film 111C1 is easily melted by heat, similar to the second film 112. Thereby, a tensile stress in a face direction of the first film 111C1 contributes to the flattening of the surface at the time of cooling after high temperature annealing.

As described above, the arrangement order of the fist film 111 and the second film 112 may be in the opposite relation to that of the embodiment shown in FIG. 3. Further, the first film 111 and the second film 112 are not necessarily in a pair or in the same numbers. For example, although the first film 111C1 is formed to contact the lower cladding 102 in the second modification, it may be so configured that a first film 111C4 (not shown) is further formed on the second film 112C3, then the core 104 is formed on the multilayer film 103C which is further flattened by the film 111C4.

Next, think about a range within which the film thickness is effective when varying the film thickness of the first film 111. The upper limit of the film thickness of one layer of the first film 111 is, as described above, to be in a level of not generating a warp which causes polarization dependency in the substrate (FIG. 3) by cooling after annealing. The lower limit of the thickness of one layer of the first film 111 is about 0.01 µm in the case of the present embodiment and modifications. If less than this level, it is difficult to maintain the film shape in annealing, which does not contribute to the flattening of the surface.

On the other hand, the film thickness of the second film 112 is 0.1 µm or more for one layer in the case of the present embodiment and modifications. If less than this thickness, it does not contribute to the flattening by melting since it is too thin, and it is less effective in flattening for the multilayer structure unless the number of layers are increased. This makes the fabricating ineffective.

Next, let's think of a preferable range of the thickness of both films although the second film 112 is thicker than the first film 111 in the present embodiment and modifications. It was found according to the experimentations that the ratio of the thickness of the first film 111 made of NSG or PSG to that of the second film 112 made of BSG or BPSG is preferably in the range between 1 to 3 and 1 to 20. If the ratio is smaller than 1 to 3, it is not preferable in the point of stress relaxation, and if the ratio exceeds 1 to 20, it is not preferable in the point of maintaining the film shape.

Although, in the embodiment and the modifications described above, the lower cladding 102 is formed on the substrate 101 and the multilayer film 103 (103B, 103C) is formed thereon, a configuration that the substrate 101 itself forms the lower cladding 102 may be acceptable. Further, although the embodiment and the modifications have such a configuration that three pairs of first film 111 (111B, 111C) and second film 112 (112B, 112C) are laminated, the number of layers is of course not limited to this. Further, although, in the aforementioned embodiment, multiple materials for constituting the film structure of the multilayer film 103 are selected in view of the softening temperature, they are not limited to this. That is, in view of the stress characteristics of materials, multiple materials having different stress characteristics may be selected.

What is claimed is:

1. An optical waveguide comprising:
   a first cladding layer disposed on a substrate;
   a core disposed on the first cladding layer for propagating an optical signal; and
   a second cladding layer disposed on the core, wherein the first cladding layer has a multilayer film on a side contacting the core, and the multilayer film comprises a plurality of films having different temperature stress characteristics.

2. The optical waveguide, as claimed in claim 1, wherein the multilayer film comprises a flat film surface contacting the core.

3. The optical waveguide, as claimed in claim 1, wherein the multilayer film comprises the plurality of films having different thickness.

4. The optical waveguide, as claimed in claim 3, wherein a layer of the multilayer film deposited on a side of the first cladding layer is formed to be thick in its film thickness, and a layer of the multilayer film deposited on a side of the core is formed to be thin in its film thickness.

5. The optical waveguide, as claimed in claim 3, wherein a layer of the multilayer film deposited on a side of the first cladding layer is formed to be thin in its film thickness, and a layer of the multilayer film deposited on a side of the core is formed to be thick in its film thickness.

6. The optical waveguide, as claimed in claim 1, wherein a refractive index of the core is n3, and a refractive index of the multilayer film is n2, a condition of n3>n2 is satisfied.

7. The optical waveguide, as claimed in claim 1, wherein the multilayer film has two layers deposited on each other.

8. The optical waveguide, as claimed in claim 7, wherein a film thickness ratio of the two layers is set to be in a range of 1:3 to 1:20.

9. The optical waveguide, as claimed in claim 1, wherein the multilayer film comprises films composed of at least two materials with different material characteristics selected from the group consisting of silica glass, and silica glass to which an additive of phosphorus, boron or germanium is added.

10. An optical waveguide comprising:
    a first cladding layer disposed on a substrate;
    a core disposed on the first cladding layer for propagating an optical signal; and
    a second cladding layer disposed on the core, wherein the first cladding layer has a multilayer film on a side contacting the core, and the multilayer film comprises a plurality of films having softening temperatures.

11. The optical waveguide, as claimed in claim 10, wherein the multilayer film comprises a flat film surface contacting the core.

12. The optical waveguide, as claimed in claim 10, wherein the multilayer film comprises the plurality of films having different thickness.

13. The optical waveguide, as claimed in claim 12, wherein a layer of the multilayer film deposited on a side of the first cladding layer is formed to be thick in its film thickness, and a layer of the multilayer film deposited on a side of the core is formed to be thin in its film thickness.

14. The optical waveguide, as claimed in claim 12, wherein a layer of the multilayer film deposited on a side of the first cladding layer is formed to be thin in its film thickness, and a layer of the multilayer film deposited on a side of the core is formed to be thick in its film thickness.

15. The optical waveguide, as claimed in claim 10, wherein a refractive index of the core is n3, and a refractive index of the multilayer film is n2, a condition of n3>n2 is satisfied.

16. The optical waveguide, as claimed in claim 10, wherein the multilayer film has two layers deposited on each other.

17. The optical waveguide, as claimed in claim 16, wherein a film thickness ratio of the two layers is set to be in arrange of 1:3 to 1:20.

18. The optical waveguide, as claimed in claim 10, wherein the multilayer film comprises films composed of at least two materials with different material characteristics selected from the group consisting of silica glass, and silica glass to which an additive of phosphorus, boron or germanium is added.

19. A method of fabricating an optical waveguide comprising the steps of:
  forming a first cladding layer according to claim 1;
  laminating, on the first cladding layer, a plurality of materials so as to have a multilayer structure according to claim 1;
  laminating a core according to claim 1 on the multilayer structure; and
  laminating a second cladding layer according to claim 1 on the first cladding layer on which the core is formed.

20. The method of fabricating an optical waveguide, as claimed in claim 19, wherein in the step of laminating the plurality of materials, a distortion stress is caused among the plurality of materials by annealing.

* * * * *